United States Patent [19]

Nakanishi

[11] Patent Number: 4,470,466

[45] Date of Patent: Sep. 11, 1984

[54] HORSESHOE ASSEMBLY

[76] Inventor: Kisaku Nakanishi, 2-3-3 Ebisuminami, Shibuya-ku, Tokyo, Japan

[21] Appl. No.: 471,261

[22] Filed: Mar. 2, 1983

[30] Foreign Application Priority Data

Nov. 1, 1982 [JP] Japan .......................... 57-166045[U]

[51] Int. Cl.³ .......................... A01L 3/00; A01L 5/00
[52] U.S. Cl. ........................................ 168/18; 54/82
[58] Field of Search ................. 168/1, 12, 17, 18, 20, 168/22; 54/82

[56] References Cited

U.S. PATENT DOCUMENTS

| 609,551 | 8/1898 | Lang | 168/1 |
| 4,189,004 | 2/1980 | Glass | 168/18 X |
| 4,346,762 | 8/1982 | Tovim | 168/17 X |

FOREIGN PATENT DOCUMENTS

| 358712 | 3/1906 | France | 168/18 |
| 196870 | 5/1923 | United Kingdom | 168/1 |
| 339193 | 12/1930 | United Kingdom | 168/22 |

*Primary Examiner*—Robert P. Swiatek
*Attorney, Agent, or Firm*—Koda and Androlia

[57] ABSTRACT

A horseshoe assembly adapted to accomodate a substantially whole part of a hoof of a leg is disclosed which includes a body made of elastomeric material of a configuration which corresponds to the bottom of the hoof, an inclined side wall portion molded integrally with the body of such a geometrical configuration as to snugly receive the hoof therein through its rear opened part from behind and a band to be bridged between both the rear end parts of the inclined side wall portion. The inclined side wall portion includes projections at the rear end parts on the side walls which are inserted through corresponding holes formed at both the end parts of the band. The band is engaged to the leg of a horse at the position located above the spherical raised portion on the lower rear part of the leg. The body has a lattice-shaped antiskid tread formed on the upper surface thereof and further includes a raised portion along the substantially U-shaped cutout which is projected upwardly at a certain inclination angle into a cavity in the bottom of the hoof. Thus, the horseshoe assembly can be tightly fitted onto the hoof of the horse without any necessity for nails or the like.

7 Claims, 3 Drawing Figures

HORSESHOE ASSEMBLY

BACKGROUND OF THE INVENTION

1. Field of the Invention

The present invention relates to a new and unique horseshoe assembly and more particularly to a horseshoe assembly adapted to accommodate a hoof of a horse's leg therein essentially including a body made of elastomeric material such as natural rubber, synthetic rubber or the like material, an inclined side wall portion molded integrally with the body to receive the instep of the hoof therein and a band adapted to be bridged between both the rear end parts of the inclined side wall portion and across the rear part of the leg.

2. Prior Art

It has been a common practice long since to put horseshoes made of steel on hoofs for all horses including racing horses and others in order to protect them from cracking and accidental injuries. A typical conventional method of putting the horseshoes on the hoofs is practiced by way of the steps of correctly locating one of them on the bottom surface of the hoof to fix it thereagainst, driving nails into the hoof from the bottom and then bending a projected part of the nails which penetrates through the hoof and projects above the upper surface of the hoof. However, when employing the above-mentioned conventional method of fixing the horseshoes onto the hoofs of a horse, it would be naturally necessary to renail them each time they are replaced with new ones, thus resulting in many nail holes being left through the hoofs. This eventually leads to no space being left for renailing through the hoof.

Particularly, in case of a racing horse it is common that a horseshoe of the type having a relatively wide width that is generally called a "flat shoe" is fixedly put on the hoof using nails while it is still red hot. At the time of a horse race, however, it is necessary that the flat shoes be replaced with other ones made of light alloy metal having a relatively narrow width that are generally called a "race shoe". Consequently, it is inevitable that replacing cycles in the order of "flat shoe-race shoe-flat shoe" are repeated for a considerably short period of time. This causes a number of nail holes to be pierced through the hoof. In an extreme case it is impossible to fit horseshoes onto the hoofs any longer and it is often found that the hoof drops or cracks during racing.

Further, due to the fact that the conventional horseshoes are made of metallic material and has no elasticity it is found that the legs hurt because of an exposure to shock caused during swift running and injuries occur due to kicking activities among horses.

In view of the problems inherent to the conventional horseshoes as described above the inventor invented improved horseshoes made of synthetic rubber and filed an application for utility model (of which invention has been granted as an utility model under Japanese Utility Model Publication No. 7,585/73).

Since the above-proposed horseshoes are made of synthetic rubber and they are fixed to the bottom of hoofs with the aid of an adhesive, there is no fear of causing injuries on the hoofs. In addition no hurt occurs to the legs during gallopping or walking owing to elasticity of the syntheic rubber and moreover no injury occurs due to playful activities among horses such as kicking or the like.

However, it is found that the improved horseshoes have still drawbacks. Specifically, after applying an adhesive onto the bottom of a hoof it is necessary to hold up a leg in the folded state until the adhesive is completely hardened, thus resulting in a long period of time being consumed. In an extreme case where a powerful adhesive is applied it becomes difficult to remove the horseshoe from the bottom of the hoof and sometimes removal can be carried out only by a machining operation such as cutting, scraping or the like.

Further, the inventor invented another improved horseshoes of the type in which they are fixed to the bottom of hoofs by applying an adhesive thereto, wherein the improvement consists in that each of the horseshoes has a surface facing the ground on which at least on recess is formed for driving a small nail into the hoof so that fixing of the horseshoe with the aid of the adhesive is temporally assisted by the nail. Later he filed an application for patent on an invention which has been granted a patent in The United States (U.S. Pat. No. 4,286,666). However, these improved horseshoes have still a drawback that as a temporary fixing means a nail should be driven into the hoof even though it has small dimensions, causing the hoof to be weakened thereby.

SUMMARY OF THE INVENTION

Hence, the present invention is intended to obviate the drawbacks as mentioned above with respect to the hitherto known horseshoes.

It is an object of the present invention to provide a horseshoe assembly which is easy to be fitted onto and removed from a hoof of a horse without any necessity for nails or the like means and thereby without any fear of causing injuries or hurt to the hoof.

It is other object of the present invention to provide a horseshoe assembly which is light in weight and assures pleasant walking and swift gallopping.

It is another object of the present invention to provide a horseshoe assembly which has no fear of injuring or hurting legs of a horse during walking and gallopping.

It is still another object of the present invention to provide a horseshoe assembly which can be fitted onto the bottom of a hoof without any necessity for special skill or training.

To accomplish the above objects there is proposed in accordance with the present invention a horseshoe assembly adapted to accommodate a substantially whole part of a hoof of a horse. The horseshoe assembly essentially includes a body made of elastomeric material of which configuration corresponding to the bottom of the hoof, an inclined side wall portion integrated with the body along its lower peripheral edge in such a geometrical configuration as to snugly receive the instep of the hoof through its rear opened part form the behind and a band means adapted to be bridged between both the rear end parts of the inclined side wall portion so as to assure tight engagement to a leg at the position located above the spherical raised portion on the lower rear part of the leg.

The inclined side wall portion includes at least one projection at both the rear end parts on the side walls of the inclined side wall protions which is adapted to be inserted through a corresponding hole formed at both end parts of the band.

To assure reliable fitting of the hoof onto the horseshoe assembly it is preferable that the body has a lattice-shaped antiskid tread formed on the upper surface thereof and further it includes a raised portion which is projected upward at a certain inclination angle into a cavity on the bottom of the roof from the peripheral edge of the substantially U-shaped cutout on the body.

In general, elastomeric material constituting the body should preferably have a JIS A hardness in the range of 60 to 97. When a horse gallops on a relatively soft ground, it is preferable that it has a JIS A hardness in the range of 85 to 97; whereas a horse walks on a relatively hard ground it is preferable that it has a JIS A hardness in the range of 60 to 70.

Other objects, features and advantages of the present invention will become readily apparent from the reading of the following description made in conjunction with the accompanying drawings.

BRIEF DESCRIPTION OF THE DRAWINGS

The accompanying drawings will be briefly described below, as follows.

DETAILED DESCRIPTION OF THE PREFERRED EMBODIMENT

Now the present invention will be described hereunder with reference to the accompanying drawings which illustrate a preferred embodiment of the invention, but it should be noted that this embodiment is merely illustrative and the invention should be not limited only to it.

Figure 1:
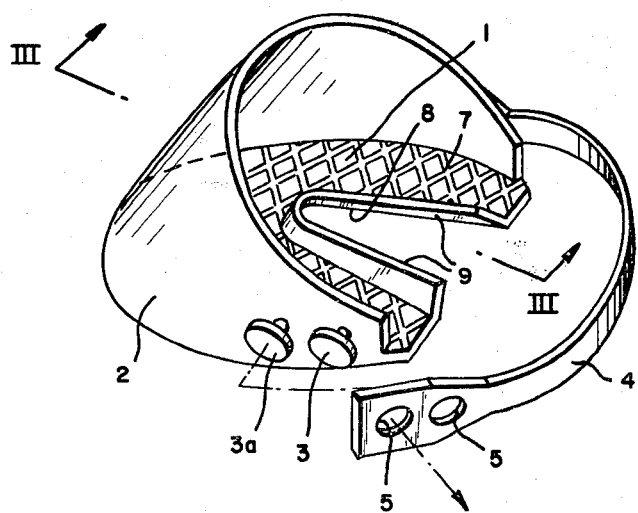
FIG. 1 is a perspective view of a horseshoe assembly in accordance with an embodiment of the present invention.
Figure 2:
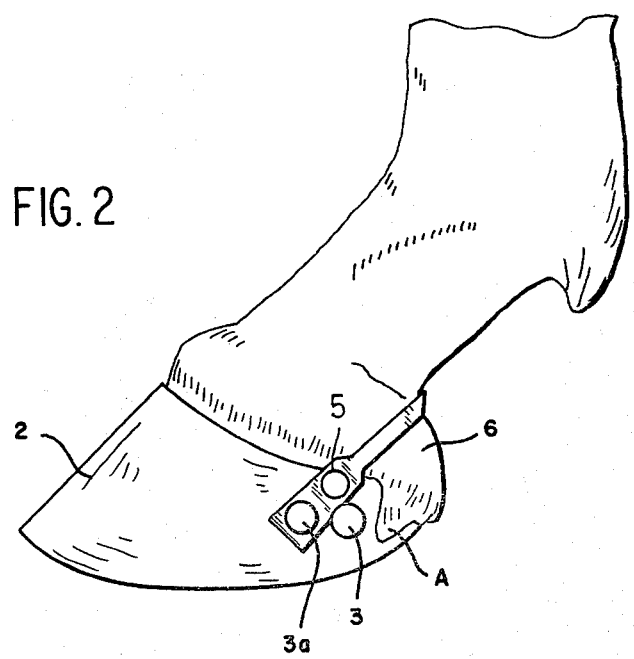
FIG. 2 is a side view of the horseshoe assembly onto which a hoof of a horse is snugly fitted.
Figure 3:
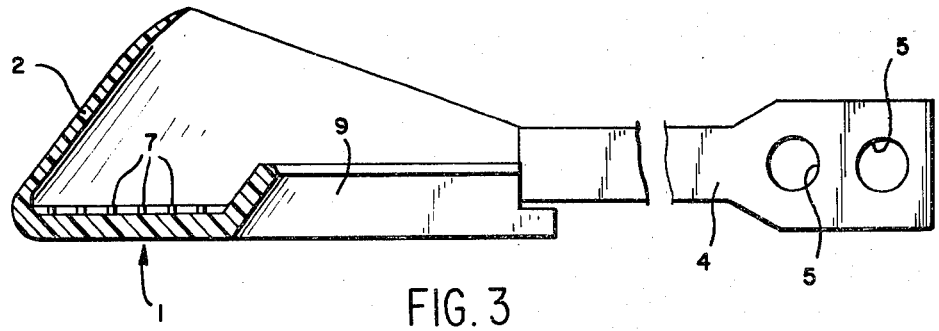
FIG. 3 is a sectional view of the horseshoe assembly taken in line III—III in FIG. 1, wherein a band is extended in the longitudinal direction.

As is apparent form FIGS. 1 to 3, a horseshoe assembly in accordance with this embodiment essentially includes a body 1 of a configuration which corresponds to the bottom of a hoof A of a foot and an inclines side wall portion 2 integrated with said body 1 along its lower peripheral edge, the inclined side wall portion 2 being opened at its rear part so as to snugly receive the whole instep of the hoof A therein from the behind. The inclined side wall portion 2 includes two projections 3 and 3a located at both the rear end parts of the side walls thereof as seen from the front. The projections 3 and 3a are located so that holes 5 formed at the free end parts of a band 4 can be fitted onto the projections 3 and 3a in such a manner that the central part of the band 4 is engaged to a horse leg at the position located above a spherical raised portion 6 (bull of the hoof) at the rear end part of the hoof A.

In the illustrated embodiment a lattice-shaped anti-skid tread 7 is formed on the upper surface of the body 1 for the purpose of assuring excellent running and fitting characteristics of the horseshoe assembly. Further, the body 1 has a U-shaped cutout 8 formed at the central part thereof, the cutout 8 including a raised portion 9 extending upward from the U-shaped edge thereof into a cavity in the bottom of the hoof. The raised portion 9 serves to prevent sand or the like foreign material from entering the bottom of the hoof and further it ensures that the hoof is snugly fitted onto the horseshoe assembly.

The body 1 and the inclined side wall portion 2 are made of elastomeric material which is effective in absorbing shock to be transmitted to the horse's leg during gallopping and preventing an occurance of injury on a leg joint or the like part. As a preferable elastomeric material for the horseshoe assembly according to the present invention, synthetic rubber such as polyurethane rubber, polybutadiene rubber, polystyrene rubber, polyvinyl series rubber or the like and natural rubber are acceptable.

It is preferable that elastomeric material constituting the body 1 have a JIS A hardness in the range of 60 to 97. If it is less than 60, the body becomes too elastic, resulting in considerable difficulty when gallopping or walking, whereas if it exceeds 97, the body becomes excessively stiff which is far from an intended concept of manufacturing the body of the horseshoe assembly with the use of elastomeric material. Particularly, when a racing horse gallops on a softer ground, for instance, dirt, lawn, meadow or the like, the body 1 should be preferably made of stiffer material having a JIS A hardness in the range of 85 to 97; whereas when it gallops on a hard ground such as paved road, stable floor or the like, it should be preferably of softer material having a hardness in the range of 60 to 70.

The process to measure the hardness of the elastomeric material to be used in the complete horseshoe of the present invention according to the JIS A hardness Measurement is as follows: A test piece or sample of elastomeric material is prepared having an opening therethrough. The thus prepared sample is mounted on the test machine, the test machine having a compression surface which has a load 1000, gf(9.81N) to the sample from the compression surface. The amount of distance the push-rod is pushed back by the elasticity rendered by the sample while under pressure was observed so as to calibrate it. The calibration is 100 when the pushed back distance is 0 and the calibration is 0 when the total extension of the push-rod is pushed back.

The band 4 serving to tightly fit the horseshoe assembly onto the hoof is preferably made of metallic material, leather or the like having excellent elasticity or expansibility.

Next, operation for fitting the horseshoe assembly onto the hoof will be described below.

The hoof A is accommodated into the space as defined by the body 1 and the inclined side wall portion 2 by inserting it from the rear open end part as seen in FIG. 1. The band 4 is then bridged between both the rear end parts of the inclined side wall protion 2, while its central part is located above the spherical raised portion 6 on the leg. The fitting operation for the horseshoe assembly is completed by engaging the projection 3 or 3a into the hole 5.

Alternatively, the fitting operation may be carried out in such a manner that the band 4 is previously bridged by inserting one of the projections 3 and 3a into the corresponding hole 5 while it is lowered downward, the hoof A is then received in the space as defined by the body 1 and the inclined side wall portion 2, and finally the band 4 is raised up until it is anchored at the position located above the bull of hoof 6.

As will be apparent from FIG. 2, an advantageous feature of the present invention is that after the fore projection 3a is fitted into the hole 5 on the band 4 the rear projection 3 acts as a support for holding the bottom part of the band 4, resulting in prevention of the latter from slipping down over the bull of the hoof 6 without any fear of injuring the leg of the horse.

To reduce a load on the bull of the hoof 6, it is preferable that the band 4 be wound or lined with soft elastomeric material such as sponge, polyurethane rubber or the like material.

Further, when the horseshoe assembly is fitted onto a hoof, it is preferable that the inside wall of the inclined wall portion 2 be lined with sponge, cloth or the like material; whereas when the band 4 is bridged between both the rear end parts of the inclined side wall portion, it is also preferable that the rear face of the band 4 be lined with cushion material such as sponge, cloth or the like material. Obviously, the above-mentioned lining of the cushion material is effective in projecting a hoof and other leg part.

As will be readily understood from the above description, there is no fear of injuring a hoof when fitting the horseshoe assembly thereonto because no nail or the like means is used for carrying our fitting operation. Further, since no adhesive is required for fitting the horseshoe assembly with the band 4 located above the bull of the hoof 6, it easily and reliably fitted onto the hoof and removed therefrom.

As a result of repeated trial uses of the horseshoe assembly of the present invention in a meadow it is confirmed that a horse gallops or runs pleasantly at a swifter stride without any occurance of slip-down owing to the snug and tight fitting of the horseshoe assembly.

Further, it is found that there is no fear of causing injuries or hurt to the feet due to kicking activity among horses, because the main parts of the horseshoe assembly are made of elastomeric material; and moreover there takes place no snow sticking when gallopping or walking on the ground covered with snow.

What is claimed is:

1. A horseshoe assembly adapted to accommodate substantially a whole part of a hoof of a leg therein, comprising:
   a body made of elastomeric material of a configuration which corresponds to the bottom of the hoof;
   an inclined side wall portion integrated with said body along its peripheral edge, said wall portion being opened at its rear part so as to snugly receive the instep of the hoof from the behind and including a rear projection, acting as a support, adjacent each side of the rear part opening and a fore projection adjacent each rear projection; and
   a band supported incliningly on the rear projections of the side wall portion, said band being fitted onto the fore projections of said inclined side wall portion at a hole of each free end thereof and for bridging between both the rear end parts of the inclined side wall portion so as to assure engagement to the leg at the position located above a bull of the hoof at the lower rear part of the leg.

2. A horseshoe assembly as defined in claim 1, wherein the inclined side wall portion and/or the band are made of elastomeric material.

3. A horseshoe assembly as defined in claim 1, wherein the body has a substantially U-shaped cutout of a configuration which corresponds to that of a cavity in the bottom of the hoof and a raised portion which projects upward at a certain inclination angle from the peripheral edge of the said cutout into the cavity of the hoof.

4. A horseshoe assembly as defined in claim 1, wherein the body includes a lattice-shaped antiskid tread formed on the upper surface thereof.

5. A horseshoe assembly as defined in claim 1, wherein elastomeric material constituting the body has a JIS A hardness in the range of 60 to 97.

6. A horseshoe assembly as defined in claim 5, wherein elastomeric material constituting the body has a JIS A hardness in the range of 85 to 97.

7. A horseshoe assembly as defined in claim 5, wherein elastomeric material constituting the body has a JIS A hardness in the range of 60 to 70.

* * * * *